(12) United States Patent
Doerry et al.

(10) Patent No.: US 8,212,714 B1
(45) Date of Patent: Jul. 3, 2012

(54) USING DOPPLER RADAR IMAGES TO ESTIMATE AIRCRAFT NAVIGATIONAL HEADING ERROR

(75) Inventors: Armin W. Doerry, Albuquerque, NM (US); Jay D. Jordan, Albuquerque, NM (US); Theodore J. Kim, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 401 days.

(21) Appl. No.: 12/550,873

(22) Filed: Aug. 31, 2009

(51) Int. Cl.
| | |
|---|---|
| *G01S 13/88* | (2006.01) |
| *G01S 13/89* | (2006.01) |
| *G01S 7/40* | (2006.01) |
| *G01S 13/00* | (2006.01) |
| *G01S 13/90* | (2006.01) |

(52) U.S. Cl. ......... 342/63; 342/25 R; 342/25 A; 342/61; 342/62; 342/64; 342/165; 342/173; 342/175; 342/176; 342/179; 342/195; 701/400; 701/408; 701/514; 701/518; 701/523

(58) Field of Classification Search ....... 342/25 R–25 F, 342/61–66, 165–176, 179, 190–197, 73–81, 342/118–122; 701/1–18, 200, 207–224, 701/400, 408, 445–453, 466, 467, 500, 501, 701/505, 514, 518, 523; 356/2, 138, 139.03; 73/178 R
See application file for complete search history.

(56) References Cited

U.S. PATENT DOCUMENTS

| | | | | | |
|---|---|---|---|---|---|
| 3,328,795 | A | * | 6/1967 | Hallmark | 342/64 |
| 3,362,024 | A | * | 1/1968 | Badewitz | 342/63 |
| 3,362,657 | A | * | 1/1968 | McDaniel | 342/62 |
| 4,490,719 | A | * | 12/1984 | Botwin et al. | 342/64 |
| 4,802,757 | A | * | 2/1989 | Pleitner et al. | 356/2 |
| 5,104,217 | A | * | 4/1992 | Pleitner et al. | 356/2 |
| 5,136,297 | A | * | 8/1992 | Lux et al. | 342/64 |
| 5,995,681 | A | * | 11/1999 | Lee et al. | 356/139.03 |
| 6,336,062 | B1 | * | 1/2002 | Yamashita | 701/13 |

OTHER PUBLICATIONS

Doerry, A.W., "Automatic Compensation of Antenna Beam Roll-off in SAR Images", Sandia National Laboratories Report, SAND2006-2632, Printed Apr. 2006.

* cited by examiner

*Primary Examiner* — Bernarr Gregory
(74) *Attorney, Agent, or Firm* — Scott B. Stahl, Esq.

(57) ABSTRACT

A yaw angle error of a motion measurement system carried on an aircraft for navigation is estimated from Doppler radar images captured using the aircraft. At least two radar pulses aimed at respectively different physical locations in a targeted area are transmitted from a radar antenna carried on the aircraft. At least two Doppler radar images that respectively correspond to the at least two transmitted radar pulses are produced. These images are used to produce an estimate of the yaw angle error.

20 Claims, 4 Drawing Sheets

USING DOPPLER RADAR IMAGES TO ESTIMATE AIRCRAFT NAVIGATIONAL HEADING ERROR

This invention was developed under Contract DE-AC04-94AL85000 between Sandia Corporation and the U.S. Department of Energy. The U.S. Government has certain rights in this invention.

FIELD OF THE INVENTION

The invention relates generally to mitigation of errors in an aircraft motion measurement system and, more particularly, to the use of a Doppler imaging radar (e.g., a synthetic aperture radar or SAR) to mitigate such errors.

BACKGROUND OF THE INVENTION

It is typical for airborne navigation to aid alignment of an Inertial Measurement Unit (IMU) or Inertial Navigation System (INS) with Global Positioning System (GPS) information. For straight and level flight, this works well except in one respect. While 3-dimensional accelerations can be aligned, as well as angular rotation offsets about horizontal axes (e.g. pitch and roll for a level platform), the third angular rotation axis, i.e. about the vertical axis, remains problematic. In straight and level flight, without horizontal decoupled accelerations, the orientation about the vertical axis is not observable in GPS derived measurements.

This rotational error about the vertical axis is sometimes referred to as 'yaw', and sometimes as 'heading error'. It is crucial to distinguish heading error as an error in the orientation of the IMU, and not as an error in the direction of translation of the platform. These are two separate things that are often confused.

It is important to appreciate that the geolocation capability and focusing of a SAR image (i.e. the pointing of the synthetic antenna) depend on the translational motion measurement accuracy, whereas the pointing of the real antenna depends on the rotational orientation motion measurement accuracy.

To first order, an excessive heading error will cause the antenna to be mis-pointed and the desired scene to be improperly illuminated by the antenna, or perhaps even not at all. The SAR image will exhibit improper reflectivity measurements, likely with a brightness gradient across the image. This has a deleterious effect on Signal-to-Noise Ratio (SNR) thereby reducing image quality, and target feature detectability. In multi-phase-center antennas, any Direction of Arrival (DOA) measurements may be unacceptably impaired.

The conventional treatment for reducing heading error in a SAR system is for the platform occasionally to experience substantial lateral accelerations via dedicated maneuvers to make the heading error observable, and hence correctable. One such maneuver is the notorious S-turn. Such maneuvers are often an interruption to the platform's mission, and generally undesirable to aircraft operators and crew. Depending on the quality of the IMU and the SAR image requirements, such maneuvers might be necessary every few minutes.

Alternatively, additional motion measurement instrumentation may be employed that makes heading errors observable, e.g. a second IMU with a transfer alignment. This is generally expensive and thereby usually nonviable as a solution. Sometimes it is nonviable regardless of cost, due perhaps to space limitations, limited communication channels, or lack of availability of the second IMU.

It is desirable in view of the foregoing to provide for heading error corrections without the aforementioned difficulties associated with conventional approaches.

DETAILED DESCRIPTION

Figure 2:
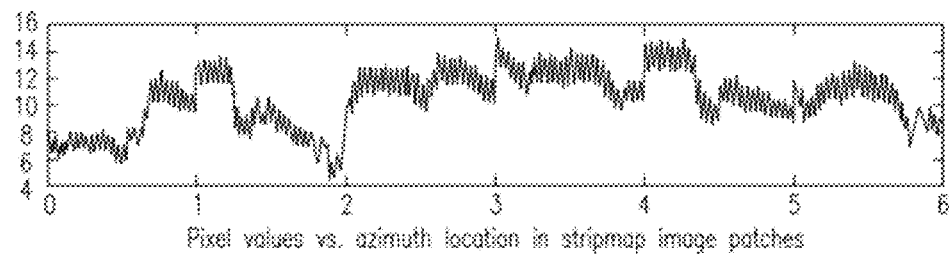
FIG. 2 graphically illustrates an example of pixel intensities versus azimuth direction in image patches of a stripmap.

Heading error (yaw orientation error) will produce an antenna pointing error that manifests as an apparent illumination gradient in a Doppler radar image, and as brightness discontinuities or seams in a stripmap of radar image patches. By measuring the gradient, and/or the discontinuity characteristics at stripmap patch seams, and/or the relationship of intensity variations as a function of antenna pointing variations, the azimuth pointing error may be calculated. This may then be used to calculate the heading error, which may in turn be fed back to the navigation Kalman filter to improve the navigation solution, especially with respect to angular orientation.

Commonly owned U.S. patent application Ser. No. 11/566,531 (filed Dec. 4, 2006) provides for mitigating the effects of a pointing error in a SAR image. While this works well for small pointing errors, it treats the symptom but does not address the root cause for the image degradation, namely that the IMU exhibits a heading error. Exemplary embodiments of the present invention exploit aspects of subject matter disclosed in U.S. patent application Ser. No. 11/566,531, which is incorporated herein by reference in its entirety.

Some embodiments are based on a parabolic model for the antenna beam pattern, as described below. Consider a uniformly illuminated antenna aperture. In the azimuth dimension, the normalized one-way far-field pattern will be a sinc( ) function, as follows $$\Theta(\phi) = sinc(b\phi) \qquad (1)$$

where $$sinc(z) = \frac{sin(\pi z)}{\pi z},$$

b is a constant that scales the input angle parameter, and $\phi$ is the azimuth angular offset from the antenna beam center. The angular beam center is often called the antenna 'electrical boresight'. In some embodiments, the constant b is chosen such that $$\Theta(0.5) = sinc(0.5b) = \frac{1}{\sqrt{2}}, \qquad (2)$$

which yields b≈0.886.

Furthermore, note that $$|\Theta(\phi)|^2 = sinc^2(b\phi) = \text{two-way far-field antenna field pattern}, \quad (3)$$

$$|\Theta(\phi)|^2 = sinc^2(b\phi) = \text{one-way far-field antenna normalized power gain}, \quad (4)$$

$$|\Theta(\phi)|^4 = sinc^4(b\phi) = \text{two-way far-field antenna normalized power gain}. \quad (5)$$

This antenna pattern has a −3 dB beamwidth of one. That is $$\phi_{az} = 1. \quad (6)$$

With b defined as above, $\phi$ is in units of 'beamwidth'. For an arbitrary beamwidth, the argument can be normalized with the actual beamwidth, $$\Theta(\phi/\theta_{az}) = sinc(b\phi/\theta_{az}). \quad (7)$$

In this case, $\phi$ has the same units as $\theta_{az}$, and $\theta_{az}$ is arbitrary. That is the ratio $(\phi/\theta_{az})$ has units of fractional beamwidth.

The two-way far-field antenna field pattern can be expanded into the series $$|\Theta(\phi/\theta_{az})|^2 = \quad (8)$$
$$sinc^2(b\phi/\theta_{az}) \approx 1 - \frac{(b\pi\phi/\theta_{az})^2}{3} + \frac{2(b\pi\phi/\theta_{az})^4}{45} - \frac{(b\pi\phi/\theta_{az})^6}{315} + \ldots$$

Note that this expansion shows a strong quadratic component, especially within the −3 dB beamwidth. Retaining just the first two terms, yields the approximation $$|\Theta(\phi/\theta_{az})|^2 \approx 1 - \frac{(b\pi\phi/\theta_{az})^2}{3} \approx 1 - 2.58(\phi/\theta_{az})^2. \quad (9)$$

However, this simplified approximation does not maintain precisely the original -3 dB beamwidth. The following modified approximation $$|\Theta(\phi/\theta_{az})|^2 \approx 1 - 2(\phi/\theta_{az})^2 \quad (10)$$

does maintain the original −3 dB beamwidth, and is nevertheless still accurate to within 0.4 dB inside of the −3 dB beamwidth.

If a small pointing error exists, then the pattern becomes $$\left|\Theta\left(\frac{\phi - \phi_\varepsilon}{\theta_{az}}\right)\right|^2 \approx 1 - 2\left(\frac{\phi - \phi_\varepsilon}{\theta_{az}}\right)^2 \quad (11)$$

where $\theta_\varepsilon$=the azimuth pointing error in units of azimuth beamwidth. (12)

More generally, in two dimensions, the pattern may be described by $$\left|\Theta\left(\frac{\phi - \phi_\varepsilon}{\theta_{az}}, \frac{\varphi - \varphi_\varepsilon}{\theta_{el}}\right)\right|^2 \approx \left(1 - 2\left(\frac{\phi - \phi_\varepsilon}{\theta_{az}}\right)^2\right)\left(1 - 2\left(\frac{\varphi - \varphi_\varepsilon}{\theta_{el}}\right)^2\right), \quad (13)$$

where $\varphi$=the elevation angular offset from the antenna beam center, and $\varphi_\varepsilon$=the elevation pointing error, and $\theta_{el}$=the elevation −3 dB beamwidth. (14)

Note that it is quite typical for a SAR system to use a fan beam, where the beam shape is wider in elevation than in azimuth, often by a factor of two or more.

Figure 1:
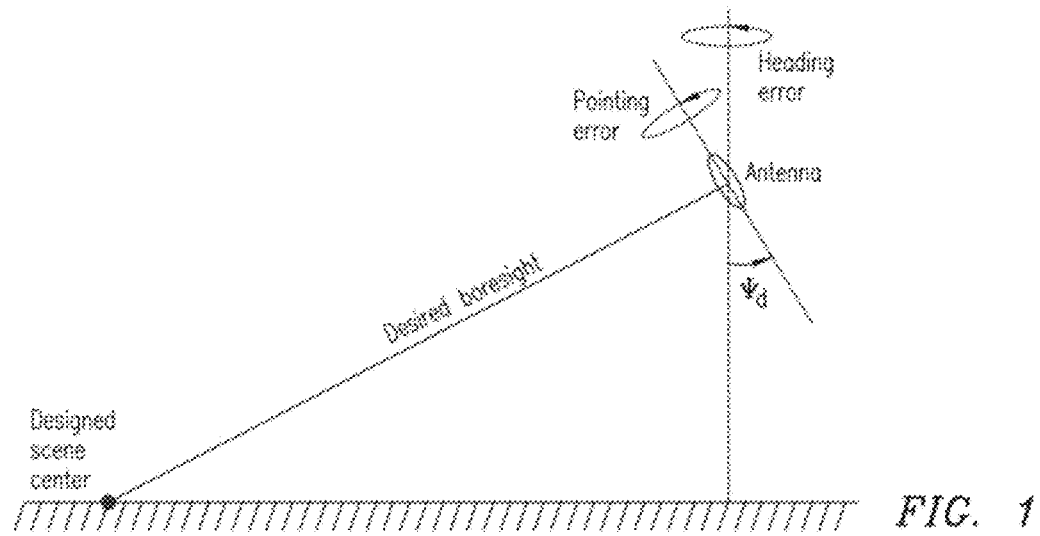
FIG. 1 diagrammatically illustrates parameters that relate pointing error to heading error.

If the azimuth pointing error $\phi_\varepsilon$ can be estimated, that estimate may be used in turn to produce the desired estimate of the heading error as follows. Heading error is the yaw angle orientation error about a locally vertical axis. Antenna azimuth pointing error is an angular orientation error about an axis that is normal to the line-of-sight direction of the desired boresight and contained in a locally vertical plane. This is illustrated in FIG. 1.

Assuming that any refraction or other atmospheric effects are negligible, then for small pointing errors, the heading error is calculated as $\theta_\varepsilon = \phi_\varepsilon \sec \psi_d$, where $\psi_d$ is the local depression angle of the desired antenna boresight. Generally, the heading error will be somewhat greater than the pointing error. The relational factor is the secant of the depression angle. In some embodiments, the estimate of the heading error is provided to a Kalman filter in the motion measurement system to improve the navigation performance of the motion measurement system.

A conventional SAR image is an array of pixels representing the measured radar reflectivity of the scene being imaged. Define the reflectivity of the scene as $\sigma_{scene}(x,y)$=SAR scene reflectivity (linear scaling, root-power magnitude), (15)

where x=azimuth offset distance from the scene center point, and y=slant range offset distance from the scene center point. (16)

In general, scene reflectivity is complex, having magnitude and phase that depend on location. Assume that during the course of the synthetic aperture, the radar antenna dwelled on the image scene center, that is, the radar intended to fix the electrical boresight of the antenna onto the image scene center point. Image locations offset from the scene center location will exhibit the effects of the antenna beam illumination due to its pattern. The magnitude of the linear-scaled output pixels will be modified by the two-way far-field antenna field pattern. Azimuth pixel offset relates to azimuth angle as $$\tan \phi \approx x/(r_{c0}+y). \quad (17)$$

where $r_{c0}$=nominal range to the image scene center. (18)

Slant range pixel offset relates to elevation angle as $$\sin \varphi \approx \left(\frac{-y}{r_{c0}+y}\right)\tan \psi_{c0} \quad (19)$$

where $\psi_{c0}$=nominal grazing angle to the image scene center (20)

This grazing angle is typically (and often much) less than 45 degrees. The actual antenna illumination function for the scene is then approximately modeled as $$I_{actual}(x, y) \approx \left(1 - 2\left(\frac{\operatorname{atan}\left(\frac{x}{r_{c0}+y}\right) - \phi_\varepsilon}{\theta_{az}}\right)^2\right)\left(1 - 2\left(\frac{\operatorname{asin}\left(\frac{-y \tan \psi_{c0}}{r_{c0}+y}\right) - \varphi_\varepsilon}{\theta_{el}}\right)^2\right). \quad (21)$$

Of course, the desired illumination function is one without any angular errors, namely $$I_{ideal}(x, y) \approx \left(1 - 2\left(\frac{\operatorname{atan}\left(\frac{x}{r_{c0}+y}\right)}{\theta_{az}}\right)^2\right)\left(1 - 2\left(\frac{\operatorname{asin}\left(\frac{-y \tan \psi_{c0}}{r_{c0}+y}\right)}{\theta_{el}}\right)^2\right). \quad (22)$$

Consequently, a model for the raw scene reflectivity measurement can be identified as the scene content scaled by the illumination function, including range losses.

$$\sigma_{raw}(x, y) = \sigma_{scene}(x, y) I_{actual}(x, y) \left[\frac{r_{c0}}{r_{c0}+y}\right]^2.$$

To radiometrically equalize the SAR image, the apparent illumination variations in the raw image need to be corrected. Conventionally, the image is adjusted to the form $$\sigma_{image}(x, y) = \frac{\sigma_{raw}(x, y)}{I_{ideal}(x, y)\left[\frac{r_{c0}}{r_{c0}+y}\right]^2}. \quad (24)$$

This is expanded and then simplified to $$\sigma_{image}(x, y) = \sigma_{scene}(x, y) \frac{I_{actual}(x, y)}{I_{ideal}(x, y)}. \quad (25)$$

These foregoing observations conspire to make the azimuth pointing error more readily apparent in a SAR image than the elevation pointing error, and hence more problematic. Consequently, the image model can be expanded and then reasonably simplified to $$\sigma_{image}(x, y) = \sigma_{scene}(x, y) \left(\frac{1 - 2\left(\frac{\operatorname{atan}\left(\frac{x}{r_{c0}+y}\right) - \phi_\varepsilon}{\theta_{az}}\right)^2}{1 - 2\left(\frac{\operatorname{atan}\left(\frac{x}{r_{c0}+y}\right)}{\theta_{az}}\right)^2}\right). \quad (26)$$

For small SAR image range extents relative to range, this can often be reduced even further to $$\sigma_{image}(x, y) \approx \sigma_{scene}(x, y) \left(\frac{1 - 2\left(\frac{\operatorname{atan}(x/r_{c0}) - \phi_\varepsilon}{\theta_{az}}\right)^2}{1 - 2\left(\frac{\operatorname{atan}(x/r_{c0})}{\theta_{az}}\right)^2}\right). \quad (27)$$

For small angles measured in radians, this can be further reduced to $$\sigma_{image}(x, y) \approx \sigma_{scene}(x, y) \left(\frac{1 - 2\left(\frac{(x/r_{c0}) - \phi_\varepsilon}{\theta_{az}}\right)^2}{1 - 2\left(\frac{(x/r_{c0})}{\theta_{az}}\right)^2}\right). \quad (28)$$

Note that for no azimuth pointing error ($\phi_\varepsilon=0$), then the image correctly measures the reflectivity of the scene. However, when a pointing error exists, then the image pixel magnitudes are affected by the pointing error.

The left side of equation (28) is a multitude of measurements. A typical SAR image might often be several million pixels, representing approximately that number of independent measurements. The right side of equation (28) contains two classes of unknowns. The first is the single number that is the azimuth pointing error, $\phi_\varepsilon$. The second class is the multitude of target scene locations corresponding to the pixel locations in the SAR image, $\sigma_{scene}(x,y)$. Although the 'ground truth' values for the target scene $\sigma_{scene}(x,y)$ are unknown, useful properties for the ground truth may often be inferred, at least in a statistical sense. This can allow determination of the pointing error in some statistical sense.

Some prior art techniques estimate the azimuth pointing error from the properties of a single SAR image patch. These techniques are described in the following. Recall the image model developed above $$\sigma_{image}(x, y) \approx \sigma_{scene}(x, y) \left(\frac{1 - 2\left(\frac{(x/r_{c0}) - \phi_\varepsilon}{\theta_{az}}\right)^2}{1 - 2\left(\frac{(x/r_{c0})}{\theta_{az}}\right)^2}\right). \quad (29)$$

It is desired to estimate $\phi_\varepsilon$ from $\sigma_{image}(x,y)$. Knowledge of the image geometry, including nominal range $r_{c0}$, is conventionally available, as is the ability to extract the azimuth offset x from pixel locations. This is in fact required in order to make conventional range illumination corrections. The image geometry parameters are typically provided in the image header information, sometimes called 'meta-data', provided by conventional SAR systems. Knowledge of the nominal azimuth beamwidth, $\theta_{az}$ is also conventionally available. Thus, everything about the image model of equation (29) is conventionally available except explicit knowledge of $\sigma_{scene}(x,y)$ and the azimuth pointing error $\phi_\varepsilon$.

For convenience, vectors along the x-dimension of the SAR image are referred to as 'rows', and vectors along the y-dimension are referred to as 'columns'. If attention is essentially focused on the magnitude of the reflectivity functions, then $$|\sigma_{image}(x, y)| \approx |\sigma_{scene}(x, y)| \left( \frac{1 - 2\left(\frac{(x/r_{c0}) - \phi_\varepsilon}{\theta_{az}}\right)^2}{1 - 2\left(\frac{(x/r_{c0})}{\theta_{az}}\right)^2} \right). \quad (30)$$

Recall that $\sigma_{image}(x,y)$ has had illumination corrections applied, except that the applied azimuth correction ignored the actual pointing error. Consequently, consider the SAR image with the azimuth correction removed, namely $$\sigma'_{image}(x, y) = \sigma_{image}(x, y)\left(1 - 2\left(\frac{(x/r_{c0})}{\theta_{az}}\right)^2\right). \quad (31)$$

This is now an uncorrected image, namely $$\sigma'_{image}(x, y) = \sigma_{scene}(x, y)\left(1 - 2\left(\frac{(x/r_{c0}) - \phi_\varepsilon}{\theta_{az}}\right)^2\right). \quad (32)$$

This now is precisely the form that can be corrected by the technique given in U.S. patent application Ser. No. 11/566,531. Briefly, in this technique, for each individual x-dimension pixel location, the corresponding column of pixels undergoes non-linear filtering to generate a representative pixel magnitude. The reference suggests median filtering, although others are also useful. Consequently, a single row-vector of representative pixel magnitudes is generated that represents an estimate of the azimuth illumination profile. This profile is then smoothed by fitting it to a low-order polynomial. In the referenced technique, the image is corrected by dividing each row by the smoothed estimated azimuth illumination profile.

Specifically, the technique in U.S. patent application Ser. No. 11/566,531 calculates $$p(x)=F_y\{\sigma'_{image}(x,y)\}, \quad (33)$$

where the desired filter is one that yields an indication of illumination, implying $$F_y\{\sigma_{scene}(x,y)\} \approx k \quad (34)$$

where $k$=a constant value representing typical scene reflectivity. (35)

This implies that $$p(x) = F_y\{\sigma_{scene}(x, y)\}\left(1 - 2\left(\frac{(x/r_{c0}) - \phi_\varepsilon}{\theta_{az}}\right)^2\right), \quad (36)$$

The smoothing operation applied by U.S. patent application Ser. No. 11/566,531 fits a polynomial to $p(x)$, that is, $p'(x)$=polynomial fit to $p(x)$ (37)

The final corrected scene is then estimated to be $$\tilde{\sigma}_{scene}(x, y) = \sigma'_{image}(x, y)\left(\frac{k}{p'(x)}\right), \quad (38)$$

where $k$ is estimated as the maximum value of $p'(x)$.

A byproduct of this correction is the ability to determine the row location of the peak of the smoothed estimated azimuth illumination profile $p'(x)$, $X_{illumination\_peak}$=value of $x$ at the peak of the smoothed profile. (39)

With this value, the azimuth pointing error can be estimated as $$\phi_\varepsilon \approx \frac{X_{illumination\_peak}}{r_{c0}}. \quad (40)$$

This technique hinges on the ability of the smoothed vector of filtered columns to adequately estimate the azimuth illumination profile. The accuracy of the estimate of the azimuth illumination profile does depend on scene content. The best scene content is featureless, with uniform statistics in all parts of the image. In the absence of images of featureless scenes, the column filtering attempts to generate representative values for each x position that avoids undue influence of problematic content. A median filter has shown often adequate for this task. Fitting the profile to a low-order polynomial further reduces the influence of anomalous column representatives. Essentially, estimation of a few polynomial coefficients from a million or more image pixels is fairly noise tolerant. Other things equal, the larger the image, the better the ability to estimate the pointing error. A larger image in range provides a more robust median value. A larger image in azimuth displays a more pronounced illumination profile.

Variations on the technique described above include the following.

Instead of filtering the uncorrected image, find representative pixel values in the original erroneously corrected image, namely find $$q(x)=F_y\{\sigma_{image}(x,y)\}. \quad (41)$$

We can then find the illumination function $$p(x) = q(x)\left(1 - 2\left(\frac{(x/r_{c0})}{\theta_{az}}\right)^2\right) \quad (42)$$

and proceed as before.

Instead of calculating $p(x)$ directly from $q(x)$, first filter $q(x)$ by fitting a line to it. That is, calculate $q'(x)=F_x(q(x))$=linear fit to $q(x)$ over $x$. (43)

Recall that for small pointing errors and uniform scene content, $q(x)$ is expected to be linear. Then calculate $$p(x) = q'(x)\left(1 - 2\left(\frac{(x/r_{c0})}{\theta_{az}}\right)^2\right) \quad (44)$$

and proceed as before.

Instead of fitting an arbitrary polynomial to $p(x)$, fit a constrained polynomial to $p(x)$, with the constraint being the form of the antenna pattern with an allowable pointing error and perhaps a scaling error.

Using some of the nomenclature from above, the image illumination is given by $$q(x) = F_y\{\sigma_{image}(x, y)\} \approx F_y\{\sigma_{scene}(x, y)\} \left( \frac{1 - 2\left(\frac{(x/r_{c0}) - \phi_\varepsilon}{\theta_{az}}\right)^2}{1 - 2\left(\frac{(x/r_{c0})}{\theta_{az}}\right)^2} \right). \quad (45)$$

Assuming $F_y\{\sigma_{scene}(x,y)\} \approx k$, then this reduces to $$q(x) \approx k \left( \frac{1 - 2\left(\frac{(x/r_{c0}) - \phi_\varepsilon}{\theta_{az}}\right)^2}{1 - 2\left(\frac{(x/r_{c0})}{\theta_{az}}\right)^2} \right). \quad (46)$$

For small offsets, this can be linearized over x to the approximation $$q'(x) = F_x(q(x)) = k\left(1 - 2\left(\frac{\phi_\varepsilon}{\theta_{az}}\right)^2\right) + 4k\left(\frac{\phi_\varepsilon}{\theta_{az}}\right)\frac{(x/r_{c0})}{\theta_{az}}. \quad (47)$$

This may also often be adequately approximated as $$q'(x) \approx k + 4k\left(\frac{\phi_\varepsilon}{\theta_{az}}\right)\left(\frac{(x/r_{c0})}{\theta_{az}}\right). \quad (48)$$

Consequently, once the linear fit q'(x) has been identified, k can be estimated as $$k \approx q'(0), \quad (49)$$

and using the slope of q'(x), the azimuth pointing error can be estimated $$\phi_\varepsilon \approx \theta_{az}^2 \left(\frac{r_{c0}}{4q'(0)}\right)\frac{d}{dx}(q'(x)). \quad (50)$$

All of the prior art single image techniques described above depend on the approximation $$F_y\{\sigma_{scene}(x,y)\} \approx k \quad (51)$$

where k is a constant value representing typical scene reflectivity. As a result, the goodness of the resulting estimate for $\phi_\varepsilon$ depends heavily on just exactly how true this assumption really is. Accurate estimates for $\phi_\varepsilon$ require a high degree of fidelity for this approximation, requiring scenes with fairly uniform regional reflectivity statistics. Such scenes are normally atypical. FIG. 2 shows that considerable variation often exists within any image patch, and from one image patch to the next, even the slope of the intensity measure varies and even changes sign. Consequently, single image techniques have limited value except for very controlled scene content.

The present work has recognized, however, that the mean or average of a large number of pointing error estimates, each produced from a single image using a technique such as those described above, may be expected to converge to the true pointing error.

Exemplary embodiments of the invention use multiple images of a scene, each with a different antenna pointing direction, to estimate the common azimuth pointing error. All of the presumptions associated with the above-described single image techniques apply. In addition, the pointing error is assumed essentially constant during the course of the collection of the multiple images required.

Repeating the foregoing model for the image $$\sigma_{image}(x, y) \approx \sigma_{scene}(x, y) \left( \frac{1 - 2\left(\frac{(x/r_{c0}) - \phi_\varepsilon}{\theta_{az}}\right)^2}{1 - 2\left(\frac{(x/r_{c0})}{\theta_{az}}\right)^2} \right), \quad (54)$$

and adding notation to distinguish among a plurality of images, yields the model $$\sigma_{image,n}(x, y) \approx \sigma_{scene,n}(x, y) \left( \frac{1 - 2\left(\frac{(x/r_{c0,n}) - \phi_\varepsilon}{\theta_{az}}\right)^2}{1 - 2\left(\frac{(x/r_{c0,n})}{\theta_{az}}\right)^2} \right) \quad (55)$$

where $n$=image index number. (56)

Furthermore, the column filtering still yields $$q_n(x) = F_y\{\sigma_{image,n}(x, y)\} \approx F_y\{\sigma_{scene,n}(x, y)\} \left( \frac{1 - 2\left(\frac{(x/r_{c0,n}) - \phi_\varepsilon}{\theta_{az}}\right)^2}{1 - 2\left(\frac{(x/r_{c0,n})}{\theta_{az}}\right)^2} \right) \quad (57)$$

However, it is not assumed that $F_y\{\sigma_{scene,n}(x,y)\}$ is adequately modeled as a constant. That is, what the single image approach models as a constant is instead modeled as an image-dependent function of azimuth position offset x, namely $$F_y\{\sigma_{scene,n}(x,y)\} = k_n(x). \quad (58)$$

This allows the filtered model to be expressed as $$q_n(x) = k_n(x) \left( \frac{1 - 2\left(\frac{(x/r_{c0,n}) - \phi_\varepsilon}{\theta_{az}}\right)^2}{1 - 2\left(\frac{(x/r_{c0,n})}{\theta_{az}}\right)^2} \right). \quad (59)$$

The uncorrected brightness model for each image is given as $$p_n(x) = q_n(x)\left(1 - 2\left(\frac{(x/r_{c0,n})}{\theta_{az}}\right)^2\right) = k_n(x)\left(1 - 2\left(\frac{(x/r_{c0,n}) - \phi_\varepsilon}{\theta_{az}}\right)^2\right). \quad (60)$$

With multiple images available, based on a measurement of $q_n(x)$, knowledge of the flight geometry, and some assumptions of $k_n(x)$, the azimuth pointing error $\phi_\varepsilon$ may be estimated.

Figure 3:
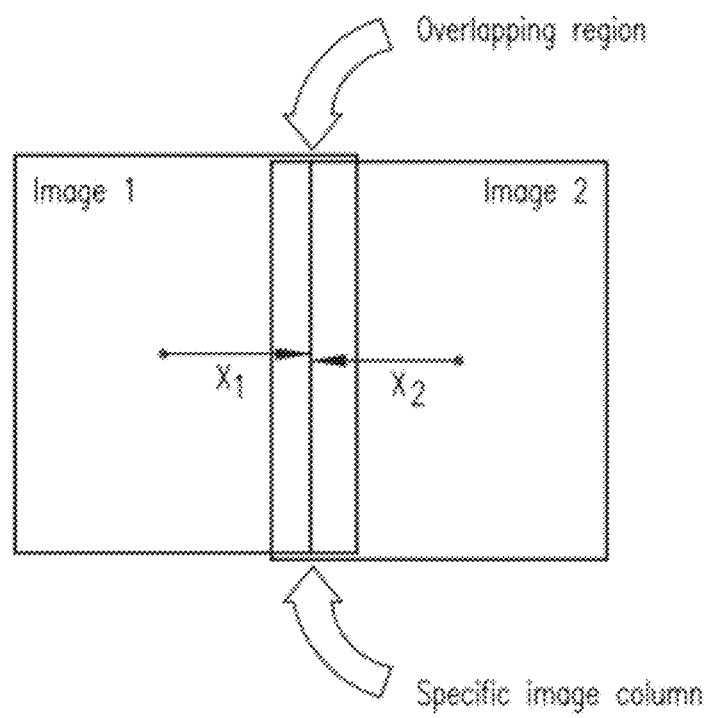
FIGS. 3-5 illustrate radar image collection techniques use in exemplary embodiments of the invention.

Consider now two images, each with the antenna pointed slightly differently. Call the first image $n_1$ and the second image $n_2$. Each image is intended to render a slightly different scene, but the scenes do overlap somewhat in azimuth, as shown in the example of FIG. 3. Identify within the overlapping region a column that is common to both images, that is, $$\sigma_{scene,n_1}(x_1,y) = \sigma_{scene,n_2}(x_2,y). \quad (61)$$

Consequently, the representative pixel values (produced by $F_y$) for the common column would also be identical, namely $$F_y\{\sigma_{scene,n_1}(x_1,y)\}=k_{n_1}(x_1)=F_y\{\sigma_{scene,n_2}(x_2,y)\}=k_{n_2}(x_2) \quad (62)$$

Focusing on the ratio $$\frac{p_{n_1}(x_1)}{p_{n_2}(x_2)} = \frac{k_{n_1}(x_1)\left(1-2\left(\frac{(x_1/r_{c0,n_1})-\phi_\varepsilon}{\theta_{az}}\right)^2\right)}{k_{n_2}(x_2)\left(1-2\left(\frac{(x_2/r_{c0,n_2})-\phi_\varepsilon}{\theta_{az}}\right)^2\right)}, \quad (63)$$

the column that is common for both scenes allows simplifying equation (63) to $$\frac{p_{n_1}(x_1)}{p_{n_2}(x_2)} = \frac{\left(1-2\left(\frac{(x_1/r_{c0,n_1})-\phi_\varepsilon}{\theta_{az}}\right)^2\right)}{\left(1-2\left(\frac{(x_2/r_{c0,n_2})}{\theta_{az}}\right)^2\right)}. \quad (64)$$

This ratio may also be written as $$\rho_{1,2} = \frac{p_{n_1}(x_1)}{p_{n_2}(x_2)} = \left(\frac{q_{n_1}(x_1)}{q_{n_2}(x_2)}\right)\left(\frac{1-2\left(\frac{(x_1/r_{c0,n_1})}{\theta_{az}}\right)^2}{1-2\left(\frac{(x_2/r_{c0,n_2})}{\theta_{az}}\right)^2}\right). \quad (65)$$

Note that the right hand side of equation (65) is composed entirely of measured or otherwise known values. Consequently, $\rho_{1,2}$ is known, and the only unknown in the following equation (66)

$$\frac{1-2\left(\frac{(x_1/r_{c0,n_1})-\phi_\varepsilon}{\theta_{az}}\right)^2}{1-2\left(\frac{(x_2/r_{c0,n_2})-\phi_\varepsilon}{\theta_{az}}\right)^2} = \rho_{1,2}. \quad (66)$$

is $\phi_\varepsilon$, the desired estimate of the azimuth pointing error. The task now is simply to solve equation (66) for $\phi_\varepsilon$. Various embodiments achieve this in various ways. Some embodiments note that the equation $$\frac{1-2(z_1-z_\varepsilon)^2}{1-2(z_2-z_\varepsilon)^2} = \rho_{1,2} \quad (67)$$

where the various parameters are defined as $$z_1 = \frac{(x_1/r_{c0,n_1})}{\theta_{az}}, \quad (68)$$

$$z_2 = \frac{(x_2/r_{c0,n_2})}{\theta_{az}},$$

$$z_\varepsilon = \frac{\phi_\varepsilon}{\theta_{az}},$$

has two real solutions for the error term $z_\varepsilon$, and these solutions are $$z_\varepsilon = \frac{-2(z_1-\rho_{1,2}z_2) \pm \sqrt{2}\sqrt{(1-\rho_{1,2})^2 + 2\rho_{1,2}(z_1-z_2)^2}}{2(\rho_{1,2}-1)}. \quad (69)$$

Since the azimuth pointing error is generally expected to be small (less than the beamwidth), some embodiments choose the solution nearest zero. In fact, the primary concern is with $$|z_1|, |z_2|, |z_\varepsilon| < \frac{1}{2}. \quad (70)$$

Some embodiments define an error function as $$\gamma(z_\varepsilon) = \left(\frac{1-2(z_1-z_\varepsilon)^2}{1-2(z_2-z_\varepsilon)^2} - \rho_{1,2}\right). \quad (71)$$

Clearly, the correct value for $z_\varepsilon$ is one that yields $\gamma(z_\varepsilon)=0$. However, $\gamma(z_\varepsilon)$ itself may be either positive or negative on either side of the correct value for $z_\varepsilon$. The goal is then to find the value for $z_\varepsilon$ that yields a minimum value for the error $\gamma(z_\varepsilon)$. Since two values for $z_\varepsilon$ provide this, begin the search at $z_\varepsilon=0$ and search in the direction of negative gradient, and then adopt the first instance of $z_\varepsilon$ to provide $\gamma(z_\varepsilon)=0$, that is, the first zero crossing.

One gradient search technique is iteratively selecting values for $z_\varepsilon$ in the following manner.

$$z_{\varepsilon,k+1} = z_{\varepsilon,k} - \frac{\gamma(z_{\varepsilon,k})}{\gamma'(z_{\varepsilon,k})} \quad (72)$$

where $z_{\varepsilon,k}$=the $k^{th}$ iteration for the estimate of $z_\varepsilon$, with $k \geq 0$, and $z_{\varepsilon,0}=0$. (73)

This is often referred to as Newton's Method. Differentiating equation (71) yields $$\gamma'(z_\varepsilon) = \quad (74)$$

$$\frac{d}{dz_\varepsilon}\gamma(z_\varepsilon) = \frac{4(z_1-z_\varepsilon)(1-2(z_2-z_\varepsilon)^2) - 4(z_2-z_\varepsilon)(1-2(z_1-z_\varepsilon)^2)}{(1-2(z_2-z_\varepsilon)^2)^2}.$$

Quite often, especially for noisy data, the convergence is overdamped by calculating $$z_{\varepsilon,k+1} = z_{\varepsilon,k} - \mu \frac{\gamma(z_{\varepsilon,k})}{\gamma'(z_{\varepsilon,k})} \quad (75)$$

where $\mu$=a convergence factor. (76)

Typically $0 < \mu \leq 1$. A value closer to one, perhaps even one, is useful.

One issue is whether the derivative $\gamma'(z_{\varepsilon,k})$ is ever zero over the range of $z_{\varepsilon,k}$ likely to be encountered. This would require $$\frac{1-2(z_2-z_\varepsilon)^2}{(z_2-z_\varepsilon)} = \frac{1-2(z_1-z_\varepsilon)^2}{(z_1-z_\varepsilon)} \tag{77}$$

in particular when $$|z_1|, |z_2|, |z_\varepsilon| < \frac{1}{2}. \tag{78}$$

Within this range, the above conditions are only satisfied when $z_2=z_1$, which is by design a disallowed event. Consequently, $\gamma'(z_{\varepsilon,k})$ is never zero over the range of $z_{\varepsilon,k}$ likely to be encountered.

As described above, some embodiments estimate the azimuth pointing error from two images with overlapping scene content, each with the antenna nominally pointed to a different scene center. For the azimuth pointing error to be measured, and ultimately corrected, it must be discoverable by suitably collecting and processing the data. Fundamentally, the real beam (due to antenna pointing) must be steered separately from the synthetic beam (due to Doppler processing). Furthermore, the real beam must move between images, but the synthetic beam must remain suitably stationary. Of course a stationary synthetic beam is accomplished by corresponding $z_i$ with $z_j$, requiring some degree of image overlap.

Some embodiments provide sufficient image overlap in FIG. 3 to produce several common columns in the overlapped images. These common columns may be processed independently, thereby to calculate multiple estimates for $z_\varepsilon$. These multiple estimates may then be combined, perhaps by a calculated mean value, or other averaging techniques (e.g. median, etc.), to yield a single estimate for $z_\varepsilon$.

Some embodiments extend the techniques described above and illustrated by FIG. 3 to more than two images. Consider now a collection of more than two images, and the pair-wise relationships $$\rho_{i,j} = \frac{1-2(z_i-z_\varepsilon)^2}{1-2(z_j-z_\varepsilon)^2} \tag{79}$$

for each pair of images for all possible i and j, however such that i≠j. Solving these leads to a collection of estimates for $z_\varepsilon$. This collection can then be averaged to find a single representative value for $z_\varepsilon$.

Figure 4:
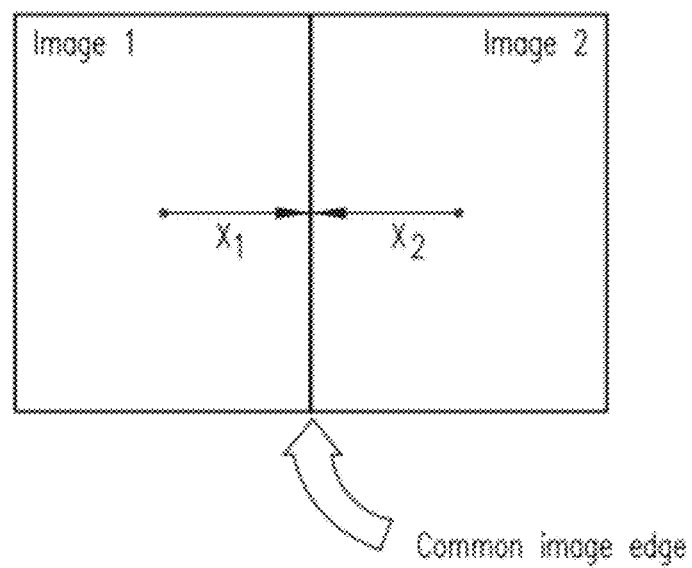

Some embodiments estimate the azimuth pointing error from a conventional stripmap image of mosaicked image patches. First, consider two images (two constituent image patches of the stripmap image) abutted to each other. This is illustrated in FIG. 4. The scene content on either side of the seam may typically be expected to be very similar. As a practical matter, the relationship $k_{n_1}(x_1)=k_{n_2}(x_2)$ may be expected to be sufficiently accurate for estimating pointing error.

For a sequence of M images, there will be (M−1) seams to exploit. This leads to (M−1) individual estimates of the pointing error, which may be averaged in some fashion (e.g. mean, median, etc.). Furthermore, for a stripmap of M images, the images often have similar geometries and identical widths, that is, for each pair $z_2=-z_1$. Furthermore yet, this allows $\rho_{1,2}$ to be calculated directly as $$\rho_{1,2} = \left(\frac{q_{n_1}(x_1)}{q_{n_2}(x_2)}\right). \tag{80}$$

For a relatively small set of images, the azimuth pointing error may be expected to be relatively stable. This allows averaging the brightness ratios across the seams directly to produce an averaged ratio value, $\rho_{1,2_{Avg}}$, and then solving for the azimuth pointing error only once, using the averaged ratio $\rho_{1,2_{Avg}}$.

Figure 5:
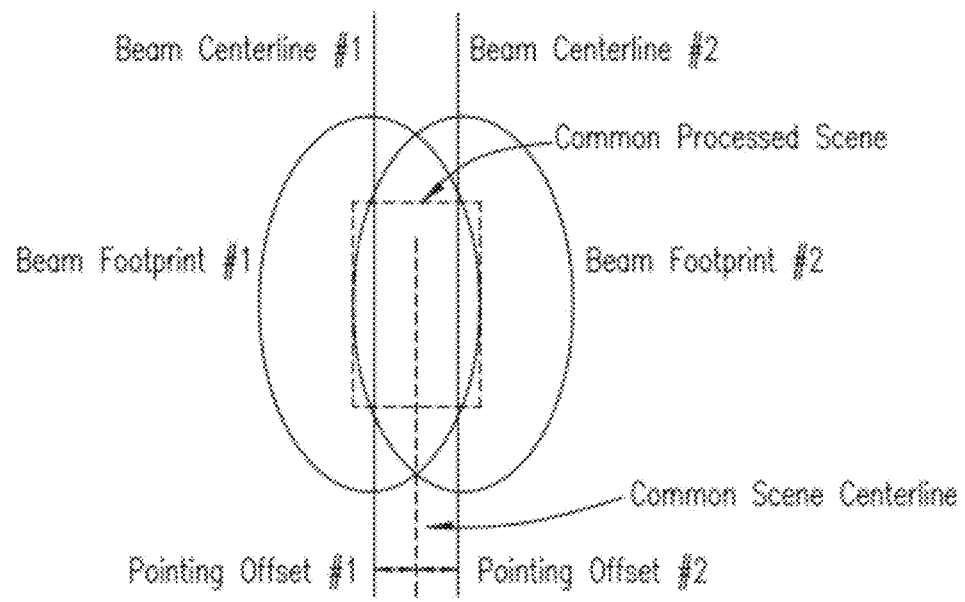

Some embodiments adapt conventional sequential lobing techniques to the task of estimating antenna azimuth pointing error. The idea of conventional sequential lobing is to view a target through different parts of the antenna beam and, by noting the difference in the target's intensity among the different antenna positions, calculate the offset of the target from the mean antenna pointing direction. The adaptation for azimuth pointing error estimation is purposely to offset the antenna beam center azimuthally from the direction of the SAR image center, and do so differently for at least two images of the same scene. This is illustrated in FIG. 5.

Define the antenna pointing offset as $$\phi_{p,n}\text{=antenna pointing offset for the }n^{th}\text{ image.} \tag{81}$$

Recall that the 'truth' of the scene reflectivity is given by $$\sigma_{scene,n}(x,y)\text{=actual scene reflectivity.}$$

The radar 'sees' the scene, but with an illumination by the antenna which is purposely offset by $\phi_{p,n}$. In addition, the antenna has a pointing error $\phi_\varepsilon$. Consequently, the raw data in the radar exhibits the characteristics of the scene but modified by the antenna illumination, namely $$\sigma_{raw,n}(x,y) \approx \sigma_{scene,n}(x,y)\left(1-2\left(\frac{(x/r_{c0,n})-\phi_{p,n}-\phi_\varepsilon}{\theta_{az}}\right)^2\right).$$

This neglects any range-dependent illumination effects. For small range swaths, the range dependence is inconsequential. For large range swaths, the variations are typically adequately compensated anyway by existing conventional techniques. As previously stated, the pointing error is most problematic in the azimuth direction. Consequently, no significant degradation in results can be expected by ignoring the range dependence of the illumination. Note that the raw data for the different images (over index n) exhibit different illumination pattern effects that depend on the known different offset components $\phi_{p,n}$, but with a common albeit unknown offset component $\phi_\varepsilon$.

Furthermore, all images (over index n) are of the same scene, albeit illuminated differently. Therefore, they all have a common coordinate frame (x,y), in contrast to embodiments described above. Each final image (index n) will be corrected by the assumed ideal antenna illumination pattern based on the individual $\phi_{p,n}$ alone. This leads to the expression for the various images as $$\sigma_{image,n}(x,y) \approx \frac{\sigma_{raw,n}(x,y)}{1-2\left(\frac{(x/r_{c0,n})-\phi_{p,n}}{\theta_{az}}\right)^2}.$$

Then the image expression can be expanded to $$\sigma_{image,n}(x, y) \approx \sigma_{scene,n}(x, y) \left( \frac{1 - 2\left( \frac{(x/r_{c0,n}) - \phi_{p,n} - \phi_\varepsilon}{\theta_{az}} \right)^2}{1 - 2\left( \frac{(x/r_{c0,n}) - \phi_{p,n}}{\theta_{az}} \right)^2} \right). \quad (82)$$

Assuming (for ease and clarity of exposition) that there are only two images, that is, that the index n assumes values $n_1$ and $n_2$, particular values of $x_1$ and $x_2$ correspond to scene content in the respective images. For these specific values $$\sigma_{image,n_1}(x_1, y) \approx \sigma_{scene,n_1}(x_1, y) \left( \frac{1 - 2\left( \frac{(x_1/r_{c0,n_1}) - \phi_{p,n_1} - \phi_\varepsilon}{\theta_{az}} \right)^2}{1 - 2\left( \frac{(x_1/r_{c0,n_1}) - \phi_{p,n_1}}{\theta_{az}} \right)^2} \right), \text{ and}$$

$$\sigma_{image,n_2}(x_2, y) \approx \sigma_{scene,n_2}(x_2, y) \left( \frac{1 - 2\left( \frac{(x_2/r_{c0,n_2}) - \phi_{p,n_2} - \phi_\varepsilon}{\theta_{az}} \right)^2}{1 - 2\left( \frac{(x_2/r_{c0,n_2}) - \phi_{p,n_2}}{\theta_{az}} \right)^2} \right).$$

Some variable substitutions follow:

$$z_1 = \frac{(x_1/r_{c0,n_1}) - \phi_{p,n_1}}{\theta_{az}}, \quad (84)$$

$$z_2 = \frac{(x_2/r_{c0,n_2}) - \phi_{p,n_2}}{\theta_{az}},$$

$$z_\varepsilon = \frac{\phi_\varepsilon}{\theta_{az}}.$$

The net illumination factors are $$\left( \frac{1 - 2\left( \frac{(x_1/r_{c0,n_1}) - \phi_{p,n_1} - \phi_\varepsilon}{\theta_{az}} \right)^2}{1 - 2\left( \frac{(x_1/r_{c0,n_1}) - \phi_{p,n_1}}{\theta_{az}} \right)^2} \right) = \frac{1 - 2(z_1 - z_\varepsilon)^2}{1 - 2(z_1)^2}, \text{ and}$$

$$\left( \frac{1 - 2\left( \frac{(x_2/r_{c0,n_2}) - \phi_{p,n_2} - \phi_\varepsilon}{\theta_{az}} \right)^2}{1 - 2\left( \frac{(x_2/r_{c0,n_2}) - \phi_{p,n_2}}{\theta_{az}} \right)^2} \right) = \frac{1 - 2(z_2 - z_\varepsilon)^2}{1 - 2(z_2)^2}.$$

The respective images are $$\sigma_{image,n_1}(x_1, y) \approx \sigma_{scene,n_1}(x_1, y) \left( \frac{1 - 2(z_1 - z_\varepsilon)^2}{1 - 2(z_1)^2} \right), \text{ and}$$

$$\sigma_{image,n_2}(x_2, y) \approx \sigma_{scene,n_2}(x_2, y) \left( \frac{1 - 2(z_2 - z_\varepsilon)^2}{1 - 2(z_2)^2} \right).$$

The column filtering described previously can still be applied to yield the filtered image intensities as $$q_{n_1}(x_1) = F_y\{\sigma_{image,n_1}(x_1, y)\} \approx F_y\{\sigma_{scene,n_1}(x_1, y)\} \left( \frac{1 - 2(z_1 - z_\varepsilon)^2}{1 - 2(z_1)^2} \right), \text{ and}$$

$$q_{n_2}(x_2) = F_y\{\sigma_{image,n_2}(x_2, y)\} \approx F_y\{\sigma_{scene,n_2}(x_2, y)\} \left( \frac{1 - 2(z_2 - z_\varepsilon)^2}{1 - 2(z_2)^2} \right).$$

As before, these q( ) functions are calculated using measured values from the images. Defining the filtered actual scene reflectivities as $$k_{n_1}(x_1) = F_y\{\sigma_{scene,n_1}(x_1,y)\}, \text{ and}$$

$$k_{n_2}(x_2) = F_y\{\sigma_{scene,n_2}(x_2,y)\},$$

leads to $$q_{n_1}(x_1) \approx k_{n_1}(x_1) \left( \frac{1 - 2(z_1 - z_\varepsilon)^2}{1 - 2(z_1)^2} \right), \text{ and}$$

$$q_{n_2}(x_2) \approx k_{n_2}(x_2) \left( \frac{1 - 2(z_2 - z_\varepsilon)^2}{1 - 2(z_2)^2} \right).$$

Manipulating this slightly gives $$q_{n_1}(x_1)(1-2(z_1)^2) \approx k_{n_1}(x_1)(1-2(z_1-z_\varepsilon)^2), \text{ and}$$

$$q_{n_2}(x_2)(1-2(z_2)^2) \approx k_{n_2}(x_2)(1-2(z_2-z_\varepsilon)^2).$$

Furthermore, these expressions can be rewritten with new parameters $$p_{n_1}(x_1) = q_{n_1}(x_1)(1-2(z_1)^2) \approx k_{n_1}(x_1)(1-2(z_1-z_\varepsilon)^2), \text{ and}$$

$$p_{n_2}(x_2) = q_{n_2}(x_2)(1-2(z_2)^2) \approx k_{n_2}(x_2)(1-2(z_2-z_\varepsilon)^2).$$

Define the ratio of the p parameters as $$\rho_{1,2} = \frac{p_{n_1}(x_1)}{p_{n_2}(x_2)}.$$

Of course, this can be expanded to the various equivalencies $$\rho_{1,2} = \frac{p_{n_1}(x_1)}{p_{n_2}(x_2)} = \frac{q_{n_1}(x_1)(1-2(z_1)^2)}{q_{n_2}(x_2)(1-2(z_2)^2)} = \frac{k_{n_1}(x_1)(1-2(z_1-z_\varepsilon)^2)}{k_{n_2}(x_2)(1-2(z_2-z_\varepsilon)^2)}.$$

Note that the expression with q( ) functions can be expanded to $$\rho_{1,2} = \left( \frac{q_{n_1}(x_1)}{q_{n_2}(x_2)} \right) \left( \frac{1 - 2\left( \frac{(x_1/r_{c0,n_1}) - \phi_{p,n_1}}{\theta_{az}} \right)^2}{1 - 2\left( \frac{(x_2/r_{c0,n_2}) - \phi_{p,n_2}}{\theta_{az}} \right)^2} \right). \quad (85)$$

Because the q( ) functions are calculated using measured values from the images, and the other parameters in this expression are all known, $\rho_{1,2}$ is readily calculated from measured and known quantities.

If both images are of the exact same scene, and the images are suitably registered, then $$x_1 = x_2, \text{ for any and all locations } x_i. \quad (86)$$

This permits simplifying to $$\rho_{1,2} = \left(\frac{q_{n_1}(x_i)}{q_{n_2}(x_i)}\right)\left(\frac{1 - 2\left(\frac{(x_i/r_{c0,n_1}) - \phi_{p,n_1}}{\theta_{az}}\right)^2}{1 - 2\left(\frac{(x_i/r_{c0,n_2}) - \phi_{p,n_2}}{\theta_{az}}\right)^2}\right), \quad (87)$$

$$z_1 = \frac{(x_i/r_{c0,n_1}) - \phi_{p,n_1}}{\theta_{az}},$$

$$z_2 = \frac{(x_i/r_{c0,n_2}) - \phi_{p,n_2}}{\theta_{az}},$$

for all possible $x_i$ locations in the images. Simplifying based on the foregoing yields, $$\rho_{1,2} = \left(\frac{k_{n_1}(x_1)}{k_{n_2}(x_2)}\right)\left(\frac{1 - 2(z_1 - z_\epsilon)^2}{1 - 2(z_2 - z_\epsilon)^2}\right).$$

But, since $x_1 = x_2$, it may be safely assumed that $$k_{n_1}(x_1) = k_{n_2}(x_2).$$

This permits simplification to the form identified earlier:

$$\frac{1 - 2(z_1 - z_\epsilon)^2}{1 - 2(z_2 - z_\epsilon)^2} = \rho_{1,2} \quad (83)$$

All quantities except $z_\epsilon$ are either known or calculated from measured and known parameters. Consequently the solution value for $z_\epsilon$ can be calculated, for example, in any manner described above for any particular value of x. If an estimate $\phi_\epsilon$ is produced for every possible $x_i$, then all of those estimates can be averaged to produce a single averaged estimate.

Figure 6:
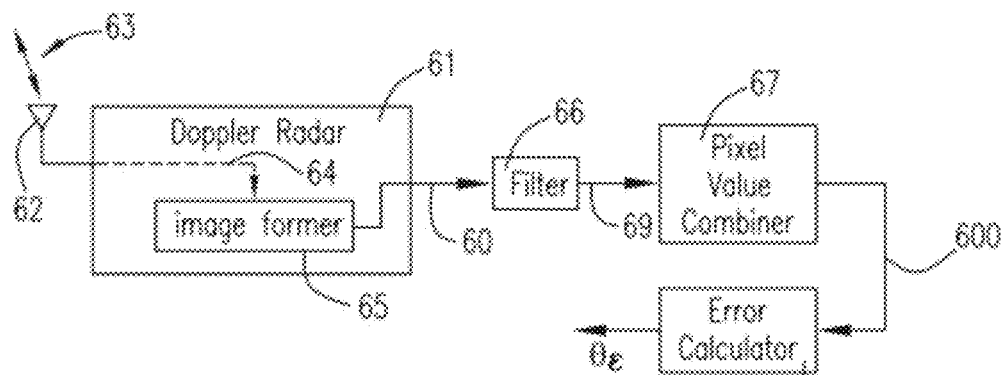
FIG. 6 diagrammatically illustrates an apparatus according to exemplary embodiments of the invention

FIG. 6 diagrammatically illustrates an apparatus provided on an aircraft and capable of estimating a heading error of the aircraft's motion measurement system according to exemplary embodiments of the invention. A conventional Doppler radar apparatus 61 (a SAR apparatus in some embodiments) includes an antenna arrangement 62 that transmits radar pulses at 63. The radar pulses are reflected from a target scene. The reflected pulses are received by the antenna arrangement 62 and provided at 64 for input to an image former 65 that forms Doppler radar images according to conventional techniques. In various embodiments, the Doppler radar apparatus 61 illuminates target scenes and forms corresponding Doppler radar images in the various manners described above relative to FIGS. 3-5.

The image former 65 is coupled to a heading error estimator shown at 66-68. Doppler radar images 60 produced by the image former 65 are input to a filter 66. In various embodiments, the filter 66 uses conventional techniques to implement various filter functions $F_y$, as described above. The resulting filtered images 69 are provided to a pixel value combiner 67 that, in various embodiments, combines filtered pixel values in the various manners described above relative to FIGS. 3-5. The result 600 of the filtered pixel value combining operation (e.g., one or more ratios of filtered pixel values) is provided to an error calculator 68 that, in various embodiments, produces an estimate $\theta_\epsilon$ of the heading error in the various manners described above with respect to FIGS. 3-5. In some embodiments, the error calculator 68 uses a single ratio of filtered pixel values to calculate $\theta_\epsilon$. In various other embodiments, the error calculator 68 uses a plurality of filtered pixel value ratios or a plurality of averages of filtered pixel value ratios to calculate $\theta_\epsilon$ in the various manners described above with respect to FIGS. 3-5.

It will be noted that, in the embodiments of FIGS. 3-6, respective filtered pixel values from respective images are directly combined during the process of producing the azimuth pointing error estimate. This is to be contrasted with the technique described above wherein a plurality of single-image pointing error estimates are averaged to produce a resultant estimate. In that averaging technique, for each pointing error estimate used in the averaging, pixel values from within a single corresponding image are directly combined during the process of producing the pointing error estimate, and the pointing error estimates from respective images are directly combined during the estimate averaging.

Some embodiments use an alternate data collection mode where the center of the antenna beam footprint is also scanned at a rate commensurate with the radar platform velocity. Consequently, each radar pulse is aimed at a different point on the ground. Some conventional SAR systems prefer this collection mode for generating stripmap images. These are often formed in a manner such that no image patch seams are obvious in the stripmap, even when pointing errors are present. Sometimes this is called "line-by-line" processing, and sometimes "conventional" stripmap processing. A pointing error would typically manifest as a reduction in the radar reflectivity measured in the desired synthetic beam.

Figure 8:
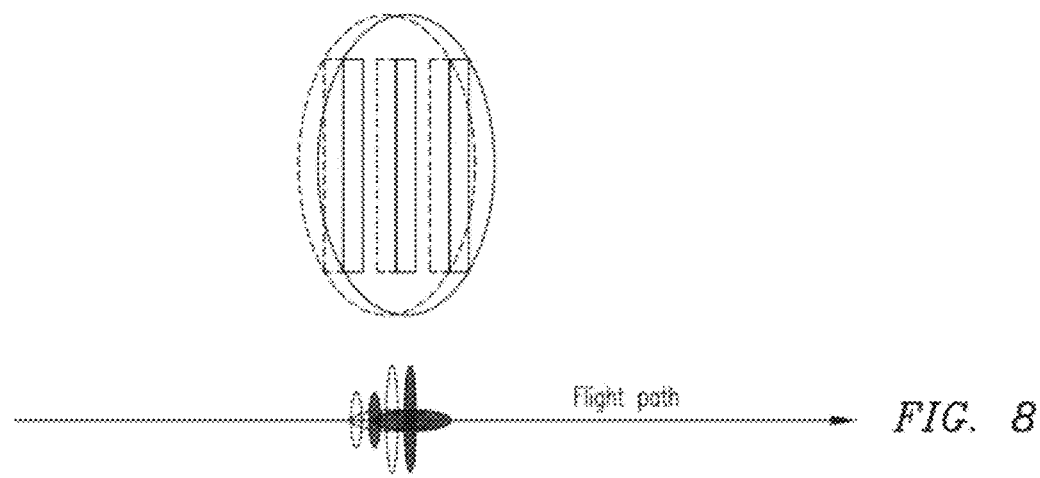
FIGS. 7 and 8 illustrate radar image collection techniques uses in exemplary embodiments of the invention.
Figure 7:
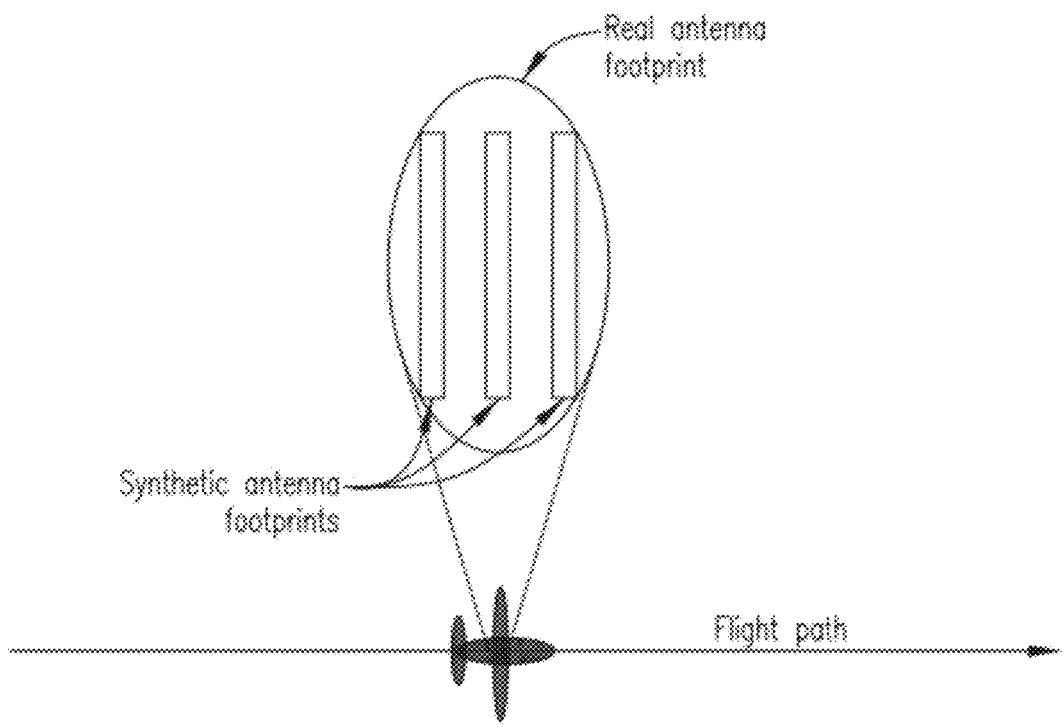

However, even with line-by-line processing, any synthetic aperture can be resolved into multiple synthetic antenna beams. This is, after all, precisely what is done with patch processing. As the desired synthetic beam is employed to form a stripmap image, so too can adjacent or offset synthetic beams be employed to form, from different parts of the real antenna beam, duplicate stripmaps that are offset (delayed or advanced) in time relative to one another. This is illustrated in FIGS. 7 and 8. If the real antenna beam has a pointing error, then some offset synthetic beam will generate a stripmap with a greater intensity than the nominally "correct" synthetic beam. The offset angle of the brightest (highest average intensity) synthetic beam relative to the nominally "correct" synthetic beam is precisely the antenna pointing error.

With a sufficient number of synthetic beam directions monitored (at least three, but more is better) then a model of the antenna beam pattern can be fit to the relative average intensity measurements, and a peak direction therewith determined.

Figure 9:
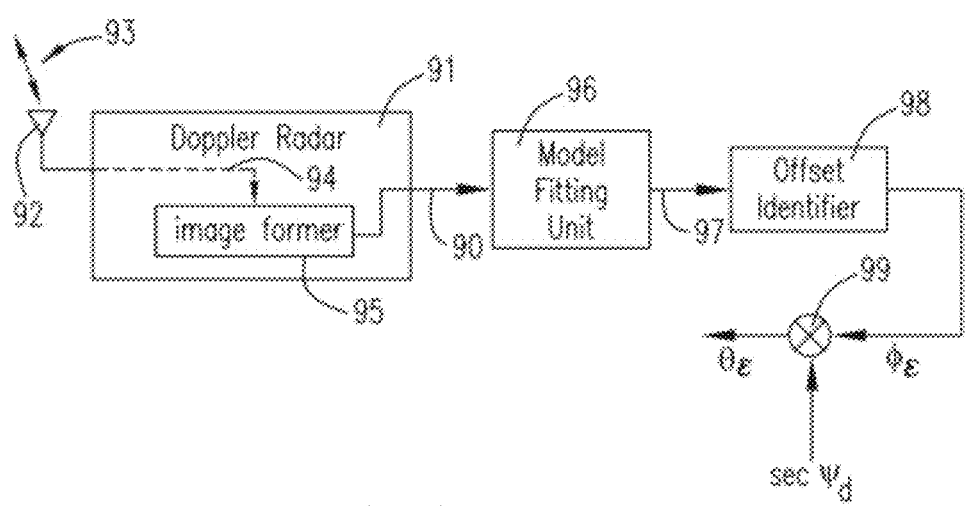
FIG. 9 diagrammatically illustrates an apparatus according to exemplary embodiments of the invention

FIG. 9 diagrammatically illustrates an apparatus provided on an aircraft and capable of estimating a heading error of the aircraft's motion measurement system according to exemplary embodiments of the invention. A conventional Doppler radar apparatus 91 (a SAR apparatus in some embodiments) includes an antenna arrangement 92 that transmits radar pulses at 93. The radar pulses are reflected from a target scene. The reflected pulses are received by the antenna arrangement 92 and provided at 94 for input to an image former 95.

The image former 95 is coupled to a heading error estimator shown at 96-99, and uses conventional line-by-line processing to produce at 90 duplicate, time-wise offset stripmap images, for example, in the manner described above with respect to FIGS. 7 and 8. A model fitting unit 96 receives these duplicate stripmap images 90, calculates average intensities of these images, and uses conventional techniques to fit each of the average intensities to a model of the antenna beam pattern. The results are provided at 97 to an offset identifier 98 that identifies the offset angle corresponding to the stripmap image whose model-fitted average intensity is highest. The identified offset angle is the azimuth pointing error estimate $\phi_\epsilon$, which is multiplied at 99 by $\sec\psi_d$ (see also FIG. 1 and the corresponding description above) to produce the desired heading error estimate $\theta_\epsilon$.

As mentioned above, IMU heading alignment may involve feeding back the estimated heading error to the navigation Kalman filter. In various embodiments, this can happen on one or both of the following schedules.

1. During the course of normal radar operation, as opportunity allows. For example, estimates obtained from stripmap seam measures (described above relative to FIG. 4) during stripmap capture operations.
2. At scheduled intervals that depend on the expected error growth rate. This might include short stripmap operations with associated stripmap seam measures (described above relative FIG. 4), or dedicated sequential lobing alignment operations (described above relative to FIG. 5).

A byproduct of accurate pointing error estimates is the ability to correct the anomalous illumination gradients in radar images. These illumination gradients are most notable as seams between the adjacent image patches within the stripmap. Having determined the azimuth pointing error estimate $\phi_\epsilon$, several results developed hereinabove may be combined to estimate the final corrected scene as $$\hat{\sigma}_{scene}(x,y) = \sigma_{image}(x,y)\left(\frac{1-2\left(\frac{(x/r_{c0})}{\theta_{az}}\right)^2}{1-2\left(\frac{(x/r_{c0})-\phi_\varepsilon}{\theta_{az}}\right)^2}\right).$$

Although some exemplary embodiments described above are based on SAR, various other embodiments use various other Doppler radar processing techniques, for example, conventional exo-clutter GMTI. Note that an intermediate step in GMTI processing is to form a range-Doppler map of the echoes received. Although Doppler is associated in GMTI with target vehicle velocity, the range-Doppler map also generally exhibits a clear Doppler band of clutter returns. Furthermore, the position in Doppler where the clutter band appears is quite predictable. The degree to which the clutter band is offset from its predicted location is in fact proportional (by a known factor) to the antenna azimuth pointing error. The clutter band is essentially a coarse-azimuth resolution SAR image, and without any antenna azimuth pattern corrections applied. Moreover, GMTI modes that ratchet dwell spots typically overlap their beam positions from one dwell to the next. This is particularly suitable for application of the techniques described above with respect to FIG. 3.

Although exemplary embodiments of the invention have been described above in detail, this does not limit the scope of the invention, which can be practiced in a variety of embodiments.

What is claimed is:

1. A method of estimating a yaw angle error of a motion measurement system carried on an aircraft for navigation, comprising:
   producing radar illumination with a radar antenna carried on the aircraft;
   producing at least two Doppler radar images based on a reflection of the radar illumination; and
   using said images to produce an estimate of the yaw angle error.
2. The method of claim 1, wherein said images correspond to respective scenes having respectively different centers.
3. The method of claim 2, wherein said images contain content common to both of said scenes.
4. The method of claim 2, wherein said images are adjacent, abutted image patches in a mosaicked stripmap format.
5. The method of claim 1, wherein said images each correspond to a common scene and have a common scene center.
6. The method of claim 1, wherein said using includes filtering said images to produce respectively corresponding filtered pixel values.
7. The method of claim 6, wherein said using includes combining selected ones of said filtered pixel values that are associated with respective ones of said images.
8. The method of claim 7, wherein said combining includes calculating a ratio between said selected filtered pixel values.
9. The method of claim 7, wherein said combining includes calculating a plurality of ratios between a plurality of pairs of said selected filtered pixel values.
10. The method of claim 1, wherein said images are SAR images.
11. An apparatus for estimating a yaw angle error of a motion measurement system carried on an aircraft for navigation, comprising:
    a radar antenna carried on the aircraft and configured to produce radar illumination;
    an input carried on the aircraft for receiving a reflection of the radar illumination;
    an image former coupled to said input and configured to produce at least two Doppler radar images based on the reflection of the radar illumination; and
    an error estimator coupled to said image former and configured to use said images to produce an estimate of the yaw angle error.
12. The apparatus of claim 11, wherein said images correspond to respective scenes having respectively different scene centers.
13. The apparatus of claim 12, wherein said images contain content common to both of said scenes.
14. The apparatus of claim 12, wherein said images are adjacent, abutted image patches in a mosaicked stripmap format.
15. The apparatus of claim 11, wherein said images each correspond to a common scene and have a common scene center.
16. The apparatus of claim 11, wherein said error estimator is configured to filter said images to produce respectively corresponding filtered pixel values.
17. The apparatus of claim 16, wherein said error estimator includes a combiner configured to combine selected ones of said filtered pixel values that are associated with respective ones of said images.
18. A method of estimating a yaw angle error of a motion measurement system carried on an aircraft for navigation, comprising:
    transmitting from a radar antenna carried on the aircraft a plurality of radar pulses aimed at respectively different physical locations in a target scene to be imaged;
    producing a plurality of Doppler radar images of said target scene that respectively correspond to said radar pulses; and
    evaluating relative intensities of said images to determine an estimate of the yaw angle error.
19. The method of claim 18, wherein said images are duplicate mosaicked stripmap images captured at respectively different points in time.

20. An apparatus for estimating a yaw angle error of a motion measurement system carried on an aircraft for navigation, comprising:
- a radar antenna carried on the aircraft and configured to transmit a plurality of radar pulses aimed at respectively different physical locations in a target scene to be imaged;
- an input carried on the aircraft for receiving reflected radar pulses that respectively correspond to said transmitted radar pulses;
- an image former coupled to said input and configured to produce a plurality of Doppler radar images of said target scene that respectively correspond to said reflected radar pulses; and
- an error estimator coupled to said image former and configured to evaluate relative intensities of said images to determine an estimate of the yaw angle error.

* * * * *